(12) United States Patent
Larson et al.

(10) Patent No.: US 9,479,201 B2
(45) Date of Patent: Oct. 25, 2016

(54) PROCESS VARIABLE TRANSMITTER WITH REMOVABLE TERMINAL BLOCK

(71) Applicant: Rosemount Inc., Chanhassen, MN (US)

(72) Inventors: Todd Lee Larson, Shakopee, MN (US); Aaron Andrew Perrault, Shakopee, MN (US)

(73) Assignee: Rosemount Inc., Chanhassen, MN (US)

( * ) Notice: Subject to any disclaimer, the term of this patent is extended or adjusted under 35 U.S.C. 154(b) by 185 days.

(21) Appl. No.: 14/225,775

(22) Filed: Mar. 26, 2014

(65) Prior Publication Data

US 2015/0280754 A1    Oct. 1, 2015

(51) Int. Cl.
| | |
|---|---|
| *G01D 11/24* | (2006.01) |
| *H04B 1/04* | (2006.01) |
| *G01D 21/00* | (2006.01) |
| *H04B 3/54* | (2006.01) |

(52) U.S. Cl.
CPC ............... *H04B 1/04* (2013.01); *G01D 11/245* (2013.01); *G01D 21/00* (2013.01); *H04B 3/54* (2013.01)

(58) Field of Classification Search
CPC ... G01D 11/245; G01L 19/14; G01L 19/003; G01L 19/0084; H01M 10/425; H01R 29/00; H02B 1/48; H04B 15/02
USPC .......................................................... 375/295
See application file for complete search history.

(56) References Cited

U.S. PATENT DOCUMENTS

| | | | |
|---|---|---|---|
| 3,247,719 A | 4/1966 | Chelner | 73/420 |
| 4,623,266 A | 11/1986 | Kielb | |
| 4,958,938 A | 9/1990 | Schwartz | 375/208 |
| 5,353,200 A | 10/1994 | Bodin et al. | 361/816 |
| 5,451,939 A | 9/1995 | Price | 340/870.31 |
| 5,498,079 A | 3/1996 | Price | |
| 5,546,804 A | 8/1996 | Johnson et al. | |
| 5,606,513 A | 2/1997 | Louwagie | 364/510 |
| 5,656,782 A | 8/1997 | Powell, II et al. | 73/756 |
| 5,954,526 A | 9/1999 | Smith | 439/136 |
| 6,062,095 A | 5/2000 | Mulrooney et al. | 73/866.5 |
| 6,146,188 A | 11/2000 | Snyder | |

(Continued)

FOREIGN PATENT DOCUMENTS

| | | |
|---|---|---|
| CN | 2170506 Y | 6/1994 |
| CN | 20167398 Y | 6/1994 |

(Continued)

OTHER PUBLICATIONS

Invitation to Pay Additional Fee from corresponding International Patent Application No. PCT/US12/043705 dated May 24, 2013. 9 pgs.

(Continued)

*Primary Examiner* — Siu Lee
(74) *Attorney, Agent, or Firm* — Westman, Champlin & Koehler, P.A.

(57) ABSTRACT

A process variable transmitter includes a sensor terminal block having a plurality of sensor line connectors to connect to sensor lines from at least one process variable sensor. The sensor terminal block defines a reception area that in a first instance accepts a removable standard power terminal block and in a second instance accepts a removable transient power terminal block. One of the removable standard power terminal block and the removable transient power terminal block is inserted in the reception area of the sensor terminal block.

17 Claims, 12 Drawing Sheets

(56) References Cited

U.S. PATENT DOCUMENTS

| | | | |
|---|---|---|---|
| 6,356,191 B1 | 3/2002 | Kirkpatrick et al. | |
| 6,484,107 B1 | 11/2002 | Roper et al. | 702/50 |
| 6,546,805 B2* | 4/2003 | Fandrey | G01L 19/003 |
| | | | 73/706 |
| 6,790,050 B1 | 9/2004 | Roth-Steielow et al. | 439/76.2 |
| 7,164,262 B2 | 1/2007 | Zacay | 324/115 |
| 7,190,053 B2 | 3/2007 | Orth et al. | |
| 7,421,258 B2 | 9/2008 | Bauschke et al. | 455/128 |
| 7,550,826 B2 | 6/2009 | Orth et al. | |
| 8,128,284 B2* | 3/2012 | Martensson | G01D 11/245 |
| | | | 374/208 |
| 8,217,782 B2 | 7/2012 | Nelson et al. | 340/539.1 |
| 8,223,478 B2 | 7/2012 | Perrault et al. | |
| 8,290,721 B2 | 10/2012 | Wehrs et al. | 702/45 |
| 8,408,787 B2 | 4/2013 | Rud et al. | |
| 9,097,563 B2* | 8/2015 | Tanabe | G01D 11/24 |
| 2002/0011115 A1 | 1/2002 | Frick | 73/718 |
| 2007/0201192 A1* | 8/2007 | McGuire | G01L 19/14 |
| | | | 361/600 |
| 2009/0257722 A1 | 10/2009 | Fisher et al. | |
| 2011/0058313 A1 | 3/2011 | Hausler et al. | 361/679.01 |
| 2011/0317390 A1 | 12/2011 | Moser et al. | 361/807 |
| 2012/0063065 A1 | 3/2012 | Perrault et al. | 361/679.01 |
| 2013/0083824 A1 | 4/2013 | Bronczyk et al. | |
| 2013/0344818 A1* | 12/2013 | McGuire | G01D 21/00 |
| | | | 455/73 |
| 2014/0269829 A1 | 9/2014 | Bronczyk et al. | 374/152 |

FOREIGN PATENT DOCUMENTS

| | | |
|---|---|---|
| CN | 1155329 A | 7/1997 |
| CN | 1898534 A | 1/2007 |
| CN | 2857251 Y | 1/2007 |
| CN | 101776491 A | 7/2010 |
| CN | 202562633 U | 11/2012 |
| CN | 203 385 492 U | 1/2014 |
| DE | 10 2005 046 331 | 3/2007 |
| DE | 10 2010 090 924 | 12/2011 |
| EP | 2 772 729 A2 | 2/2014 |

OTHER PUBLICATIONS

Rosemount "Rosemount 3144P Temperature Transmitter," Mar. 2008.
Office Action from U.S. Appl. No. 13/251,726, dated Mar. 29, 2013.
Final Office Action from U.S. Appl. No. 13/251,726, dated Nov. 14, 2013.
Wika: "Digital Temperature Transmitter," Jul. 2008. 7 pgs.
Office Action from Chinese Patent Appln. No. 201120555381.1 dated Jun. 6, 2012. 3 pgs.
Product Data Sheet. Rosemount 644 Temperature Transmitter. Oct. 2010 by Emerson Process Management.28 pgs.
Bulletin IC50A0-E. Temperature Transmitters YTA Series. Yokogawa Electric Corporation. 8 pgs.
Product Data Sheet 3.80. TDZ&THZ Smart Hart® Temperature Transmitters. Apr. 2005 by Moore Industries. 16 pgs.
Notification of Transmittal of the International Search Report and the Written Opinion of the International Searching Authority for PCT/US2012/043705, dated Apr. 23, 2014.
Office Action from U.S. Appl. No. 13/251,726, dated Apr. 24, 2014.
Office Action from Chinese Application No. 201110443913.7, dated Mar. 26, 2014.
Communication Under Rules 161(1) and 126 EPC from European Application No. 12743559.2, dated Jul. 4, 2014.
Office Action from Chinese Application No. 201110443913.7, dated Nov. 4, 2014.
Notification of Transmittal of the International Search Report and the Written Opinion of the International Searching Authority for PCT/US2014/049710, dated Oct. 28, 2014.
Notification of Transmittal of the International Search Report and the Written Opinion of the International Searching Authority for PCT/US2014/043123, dated Nov. 20, 2014.
Notification of Transmittal of the International Search Report and the Written Opinion of the International Searching Authority for PCT/CN2013/084662, dated Jun. 30, 2014.
Notification of Transmittal of the International Search Report and the Written Opinion of the International Searching Authority for PCT/US2015*014560, dated May 19, 2015.

* cited by examiner

FIG. 16 ately accepts a removable standard power terminal block and in a second instance accepts a removable transient power terminal block. One of the removable standard power terminal block and the removable transient power terminal block is inserted in the reception area of the sensor terminal block.

PROCESS VARIABLE TRANSMITTER WITH REMOVABLE TERMINAL BLOCK

BACKGROUND

The present invention relates to process variable transmitters. In particular, the present invention relates to terminal blocks in process variable transmitters.

In processing plants, gases and liquids are routed through various conduits and tanks. In order to control the operation of a plant, the current status of the liquids and gases in the various portions of the plant as well as the state of controlled devices such as valves and burners must be monitored. The variables monitored to determine these states are referred to generally as process variables and can include flow rates, pressures, differential pressures, temperatures, tank levels, valve positions, and the like. These process variables are provided to a control room by field devices known as process variable transmitters. Each process variable transmitter includes a transmitter housing that encases at least one circuitry module used to determine a value for a process variable. The circuitry module determines the value for the process variable based on one or more sensor signals it receives from one or more process variable sensors that are measuring a state of the process fluid or a controlled device. The circuitry module also transmits the value of the process variable to a control room using either wireless communication or wired communication. In some cases, the circuitry module transmits the process variable using a two-wire process control loop which is also used to power the process variable transmitter.

In some process variable transmitters, the sensors are connected to the circuitry module by wires that run from the sensor to sensor line connections on a terminal block in the transmitter housing. These terminal blocks may also include power line connectors for connecting power lines to the process variable transmitter.

Because the terminal block receives sensor lines that are connected to the sensors, there is a chance that process fluid will enter the transmitter housing if the process fluid breaches the sensor or a vessel holding the sensor. To avoid damage to the circuitry module and to reduce the risk of the circuitry module igniting the process fluid during such a breach, many process variable transmitters have two chambers that are sealed off from one another by a sealing layer. The first chamber houses the circuitry module and the second chamber houses the terminal block. Fixed conductors attached to the connectors of the terminal block extend through the sealing layers between the chambers and attach to the circuitry module. The permanent nature of the electrical connections between the fixed conductors and the connectors of the terminal block help to ensure that the sensor signals are not corrupted by poor connections between the terminal block and the circuitry module. Such poor connections can negatively impact the sensor signal and result in faulty process variable values.

SUMMARY

A process variable transmitter includes a sensor terminal block having a plurality of sensor line connectors to connect to sensor lines from at least one process variable sensor. The sensor terminal block defines a reception area that in a first instance accepts a removable standard power terminal block and in a second instance accepts a removable transient power terminal block. One of the removable standard power terminal block and the removable transient power terminal block is inserted in the reception area of the sensor terminal block.

In further embodiments, a terminal block for a process variable transmitter includes a shroud having a raised sensor section comprising a plurality of sensor line connectors for connecting to sensor lines and a recessed power section having a power interface wherein the power interface is recessed relative to at least one of the sensor line connectors. A power terminal module having a plurality of power line connectors for connecting to power lines and a mating power interface mated with the power interface of the shroud is positioned within the recessed power section.

A method is provided that includes accessing a terminal block permanently installed in a process variable transmitter and inserting a power terminal module into a recess of the terminal block such that a power interface in the recess mates with a power interface on the power terminal module. The power terminal is then secured to the terminal block.

DETAILED DESCRIPTION OF ILLUSTRATIVE EMBODIMENTS

Embodiments described below provide a terminal block for a process variable transmitter that includes a fixed portion that is permanently attached to a terminal housing and a removable portion that can be removed from the terminal housing. The fixed portion is referred to as a sensor terminal block and includes sensor line connectors. The removable portion is referred to as a power terminal block and includes two power line connectors and two mating elements that are used to connect the two power line connectors to permanent conductors in the terminal housing. Different types of power terminal blocks are provided including a standard power terminal block that directly connects the power line connectors to the mating elements and a transient power terminal block that provides circuit elements for transient voltage protection between the power line connectors and the mating elements. In some embodiments, the standard power terminal block has a similar shape to the transient power terminal block such that a standard power terminal block may be replaced with a transient power terminal block in the transmitter housing.

In past industrial temperature transmitter designs, the terminal block is arranged as a singular component that is installed within the housing. Adding functionality/variability means creating multiple part options that need to be installed at later stages in the manufacturing process. Installing these components at a later stage in manufacturing requires a pluggable connection, which can be impacted by environmental conditions such as humidity and vibration. The measurement signals for sensor connections that run on these connections are very sensitive to slight changes and require extra care in assembly. The key variables within the terminal block are the number of terminals for sensors (if any), the number of terminals for power and how transient protection can be added to the terminal block. In past designs, transient protection has been added as a separate component that is electrically connected to the existing power terminals and is placed in a space normally used to route power and sensor lines within the housing. As a result, current designs do not allow for much variability and have a direct impact on the amount of space within the housing cavity for wiring when the transient protector is installed.

The terminal block of the embodiments described below separate the power and sensor terminals in such a way that the power portion is integrated with the current footprint but is allowed to be swapped with a transient protector option (replace instead of install over as was done in the past). This design provides benefits such as making it easier to attach wires for installation (more space available), having lower cost compared to adding separate transient protectors (shared plastics and components), allowing for future power options without replacing the sensor terminals, improving the look and feel of the terminal block, allowing field upgrades for transient protection without swapping the entire terminal block, and supporting late customization during manufacturing. In particular, the new design allows a power component to be switched to a transient protector of the same shape without the need to remove/replace the entire terminal (sensor connection) assembly. The transient protector is placed in the same space as a standard power terminal block and thus does not take up any more space than the standard power terminal block. This allows more space for wiring within the housing cavity. In addition, as future power terminal circuitry is designed, new power terminal blocks may replace older power terminal blocks without affecting the sensor terminal blocks. Thus, field upgrades for the power terminal blocks including field upgrades for transient protection can be made without swapping the entire terminal block. Further, the sensitive connections for the sensor terminals remain fixed within the transmitter housing during replacement of the power terminal blocks thus protecting the sensor signal from degradation due to poor connections between the sensor connection terminal and the circuitry module. In addition, the designs below allow for less expensive transmitters with transient protection since a separate transient protection circuit is not needed. Instead, the standard power terminal block is replaced with a transient power terminal block thus reducing the cost of the transmitter compared to transmitters in which transient protection is simply added as an additional circuit to the terminal block.

Figure 1:
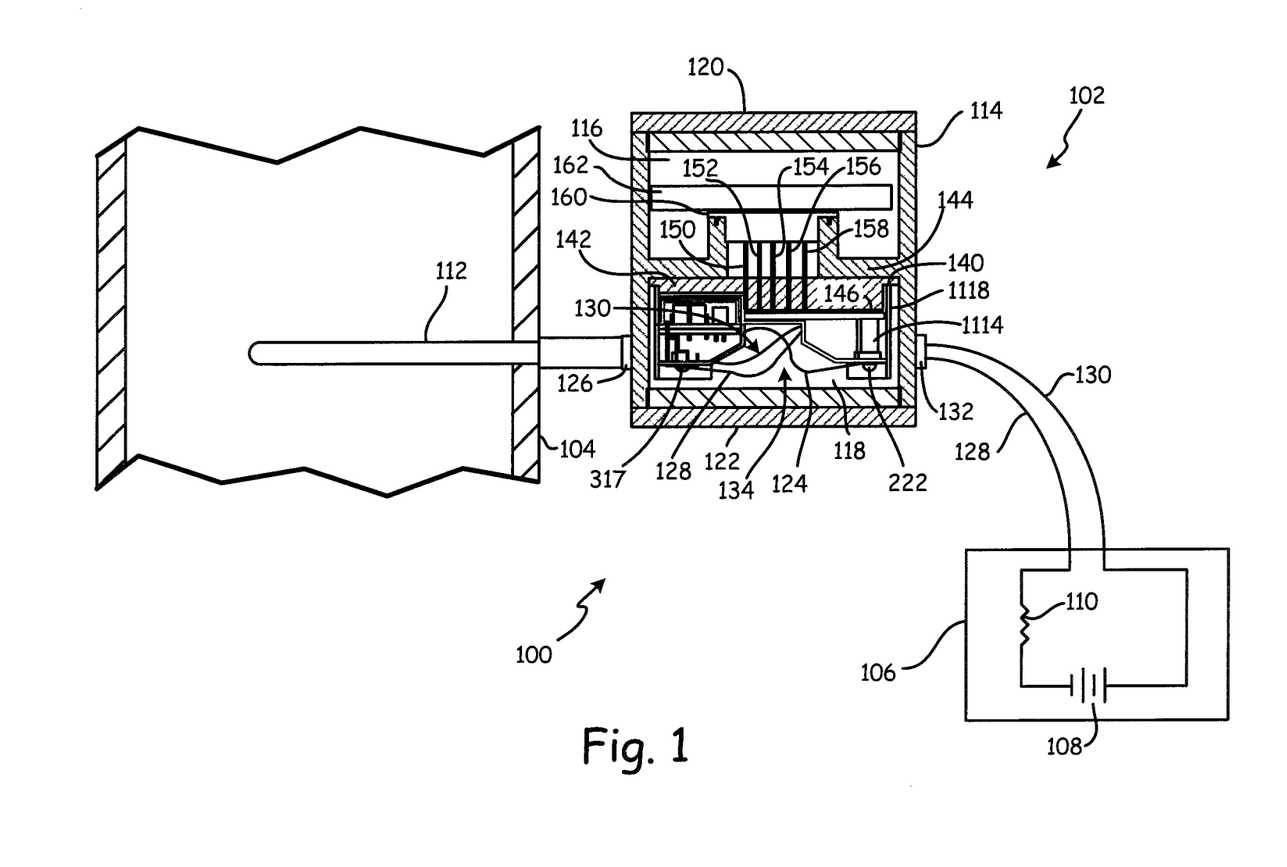
FIG. 1 is a cross-sectional view of a process variable transmitter positioned within a process environment.

FIG. 1 provides a diagram of a process environment 100 in which a process variable transmitter 102 senses a condition in a conduit 104 containing a process fluid, generates a process variable from the sensed condition and provides the process variable to a control station 106 depicted as a power source 108 and a resistance 110. Process variable transmitter 102 includes a probe 112 that is inserted within conduit 104 and which includes one or more sensors such as one or more temperature sensors. Transmitter 102 couples to the control station 106 through power lines 128 and 130. Lines 128 and 130 may comprise a process control loop such as a two-wire process control loop. In such a configuration, the same two lines 128,130 carry both power to power the transmitter 102, as well as information such as a current level which is related to the sensed process variable.

Transmitter housing 114 includes two chambers 116 and 118 each sealed by respective caps 120 and 122. Sensor lines, such as sensor line 124 extend from process variable sensors in probe 112 to chamber 118. Sensor line 124 enters chamber 118 through a port 126 located on a first side of housing 114. Power lines 128 and 130 enter chamber 118 through a port 132 on a second side of housing 114. Power lines 128 and 130 and sensor line 124 are connected to a terminal block 134 at respective connectors such as sensor line connector 222 for sensor line 124 and power line connector 317 for power line 128. A back section 140 of a shroud 1118 of terminal block 134 is permanently connected to housing 114 through a sealing layer 142, which bonds back section 140 to a center wall 144 of housing 114. A conductive layer 146 has individual conductive traces that make contact with the ends of posts such as post 1114, which are electrically coupled to the line connectors such as line connectors 136 and 138. The traces in conductive layer 146 conduct signals and power from the sensor lines and power lines to respective pins such as pins 150, 152, 154, 156 and 158, which extend through sealing layer 142 and sealing cap 160 to circuitry module 162. Sealing cap 160, pins 150, 152, 154, 156 and 158 and sealing layer 142 cooperate to seal chamber 116 from chamber 118. Although five pins are shown in FIG. 1, those skilled in the art will recognize that additional pins may be provided and in some embodiments, up to 10 pins pass through sealing cap 160.

Circuitry module 162 uses the sensor signals on the respective pins passing through cap 160 to determine one or more process variable values. Circuitry module 162 then modifies the power signal on the power line pins coupled to power lines 128,130 to transmit the values of the process variables to control station 106. In accordance with some embodiments, circuitry module 162 modifies the power signal using an established protocol such as HART®, FOUNDATION Fieldbus, PROFIBUS, WORLDFIP, Device-Net, and CAN communication protocols, etc. For instance, under the HART® communication protocol, circuitry module 162 sets the current on the power lines to a value between 4-20 mA to reflect the value of the process variable.

Figure 2:
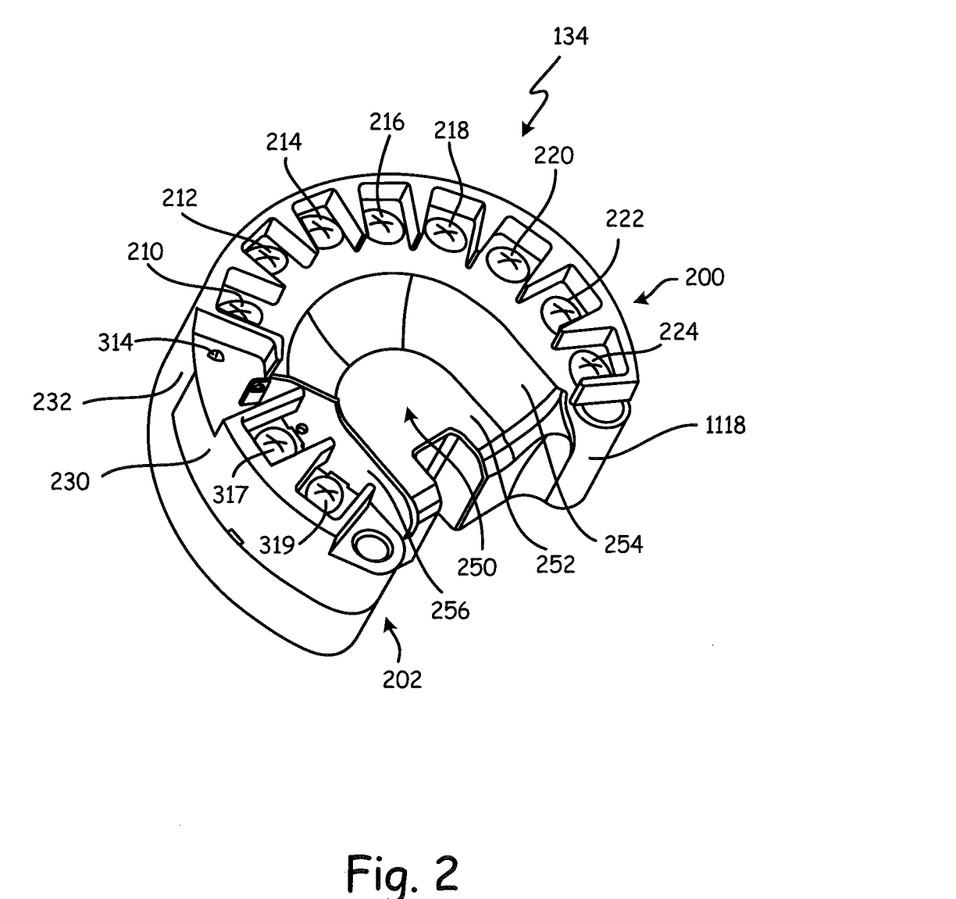
FIG. 2 is a front perspective view of a terminal block in accordance with one embodiment.

FIG. 2 provides a front perspective view of one embodiment of terminal block 134. Terminal block 134 includes a sensor terminal block 200 and a removable power terminal block 202. Removable power terminal block 202 is also referred to as a power terminal module. Sensor terminal block 200, as shown in FIG. 1, includes shroud 1118 that is permanently attached to housing 114 through sealing layer 142. Removable power terminal block 202 is not permanently attached to housing 114 and may be removed from sensor terminal block 200 as depicted in the exploded perspective view of FIG. 3. As show in FIGS. 2 and 3, removable power terminal block 202 is received in a recess or recessed power section 300 also referred to as a reception area. Recess 300 includes a shaped cavity 302, a recess wall 304, a connection surface 306, an opening 308 and a power interface 310. Removable power terminal block 202 may be temporarily fixed to sensor terminal block 200 by a fastener 314, which passes through an opening in an arm 316 of removable power terminal block 202 and into opening 308 of sensor terminal block 200.

Figure 3:
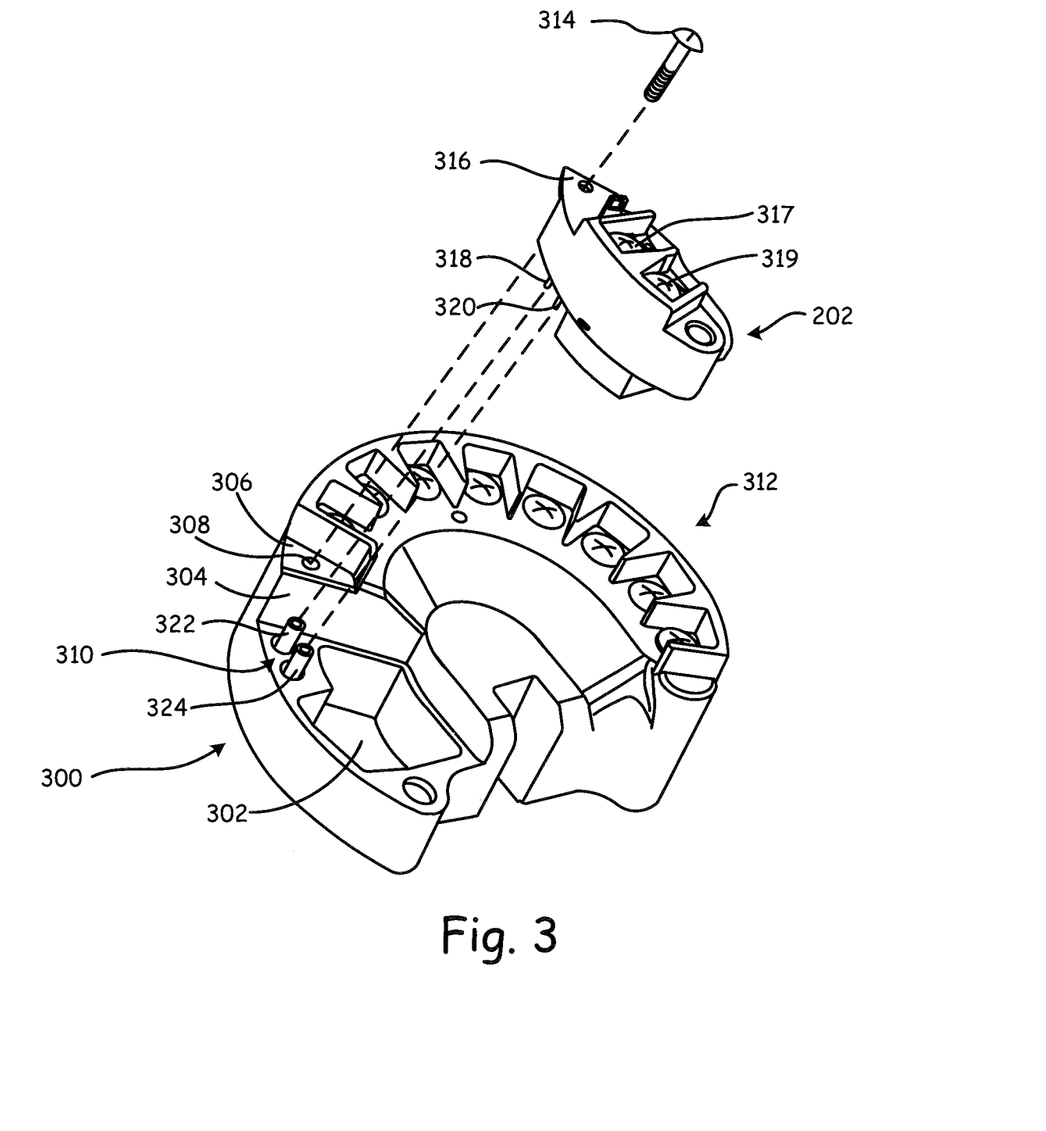
FIG. 3 is a front perspective exploded view of the terminal block of FIG. 2.

Recess 300 is recessed relative to raised sensor section 312, which includes sensor line connectors 210, 212, 214, 216, 218, 220, 222 and 224. Power interface 310 is located within recess 300 and as such is also recessed relative to raised sensor section 312 and relative to each of the sensor line connectors.

Removable power terminal block 202 includes power terminals 318 and 320, which in some embodiments take the form of conductive pins and in other embodiments take the form of conductive cylinders. Power terminals 318 and 320 together form a mating power interface designed to mate with power interface 310 of sensor terminal block 200. As shown in FIG. 3, power interface 310 includes conductive cylinders 322 and 324, which are positioned to accept conductive pins 318 and 320. In embodiments where power terminals 318 and 320 are conductive cylinders, power interface 310 will include conductive pins that are positioned to be inserted within power terminals 318 and 320 when removable power terminal block 202 is inserted in recess 300. In FIG. 2, power terminals 318 and 320 have been mated with conductive cylinders 322 and 324 of recess 300 and thereby form an electrical connection with conductive cylinders 322 and 324.

Power terminal block 202 also includes power line connectors 317 and 319, which are coupled to power terminals 318 and 320 by a circuit within power terminal block 202. The components of the circuit are discussed in more detail below.

As shown in FIGS. 2 and 3, the removable power terminal 202 may be easily slid onto sensor terminal block 200 and slid off sensor terminal block 200. In addition, removable power terminal block 202 may be temporally fixed to sensor terminal block 200 using fastener 314. This allows removable power terminal block 202 to be removed and replaced with a different power terminal block or with a different type of power terminal block without replacing shroud 1118 of sensor terminal block 200. In particular, a standard power terminal block representing a first type of power terminal module can be replaced with a transient power terminal block representing a second type of power terminal module. In a standard power terminal block, the power line connectors are connected directly to the respective power terminals 318 and 320 and do not include transient voltage suppression elements and as such lack transient voltage suppression. In transient power terminal blocks, transient power protection components are provided, which suppress transient voltages and currents above certain thresholds to limit the voltage and/or current reaching power terminals 318 and 320. In accordance with some embodiments, the standard power terminal block and the transient power terminal block both have substantially the same external shape as power terminal 202 of FIGS. 2 and 3 but may have different markings to distinguish the two types of power terminal blocks from each other.

When power terminal block 202 is positioned within recess 300 of sensor terminal block 200, an outer cylindrical surface 230 of power terminal block 202 is aligned with an outer cylindrical surface 232 of shroud 1118 of sensor terminal block 200. The cylindrical surfaces are generally co-axial with an interior cylindrical surface of transmitter housing 114 when terminal block 134 is inserted in transmitter housing 114.

Pursuant to this embodiment, removable power terminal block 202 and sensor terminal block 200 together define a partial well 250 that provides space for wires that are to be connected to power line connectors 317 and 319 and sensor line connectors 210, 212, 214, 216, 218, 220, 222 and 224. The base of well 250 is a planar surface 252 that is defined in part by an angled surface 254 of sensor terminal block 200 and an angled surface 256 of removable power terminal block 202. Well 250 includes at least one open side that allows for the wires to be routed through the well.

Figure 4:
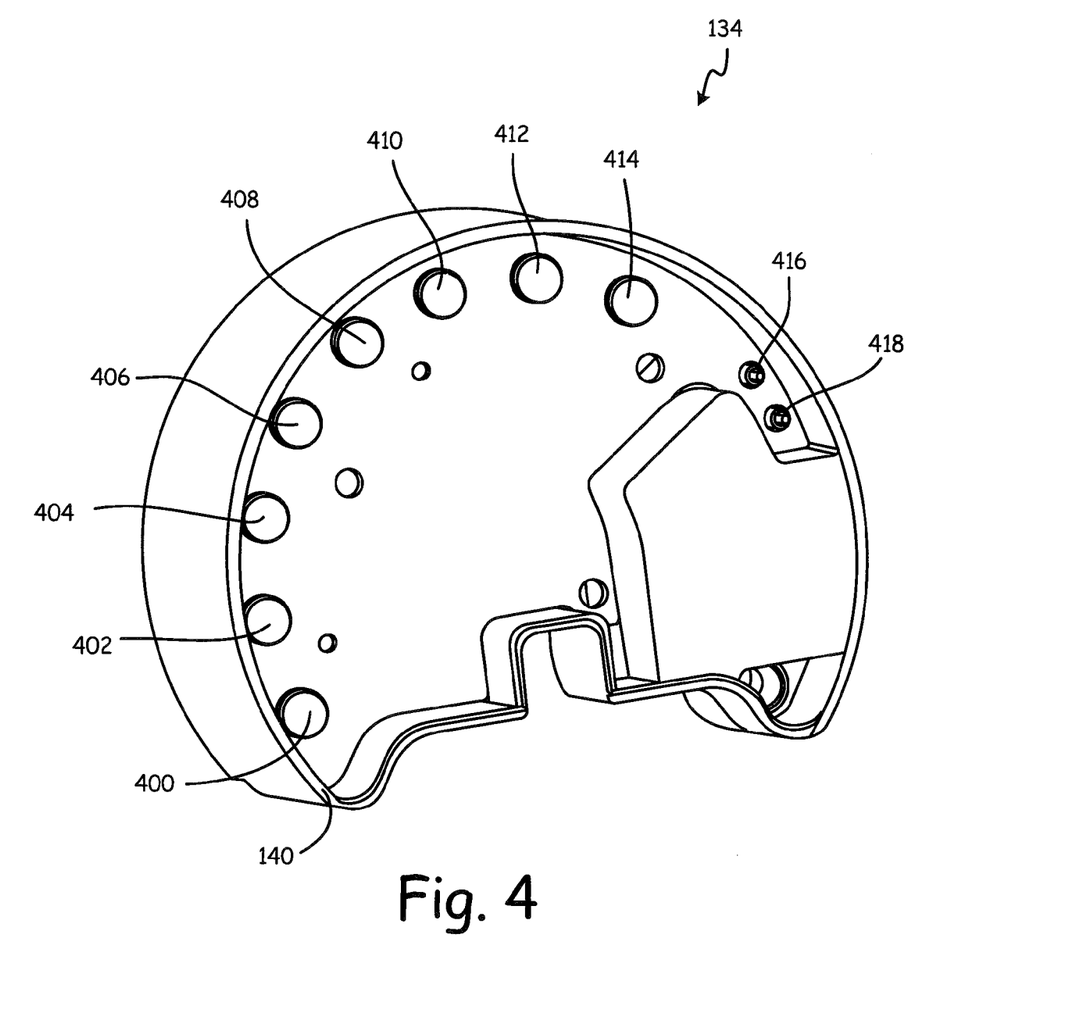
FIG. 4 is a back perspective view of the terminal block of FIG. 2.

FIG. 4 provides a back view of terminal block 134 showing the ends 400, 402, 404, 406, 408, 410, 412 and 414 of conductive posts, which are respectively electrically coupled to connectors 224, 222, 220, 218, 216, 214, 212 and 210. In addition, back ends 416 and 418 of conductive cylinders 322 and 324 are exposed at the back of terminal block 134. Each of post ends 400, 402, 404, 406, 408, 410, 412 and 414 and the back ends 416 and 418 of conductive cylinders 322 and 324 are placed in contact with a respective conductive trace in conductive layer 146 when terminal block 134 is permanently fixed to transmitter housing 114.

Figure 5:
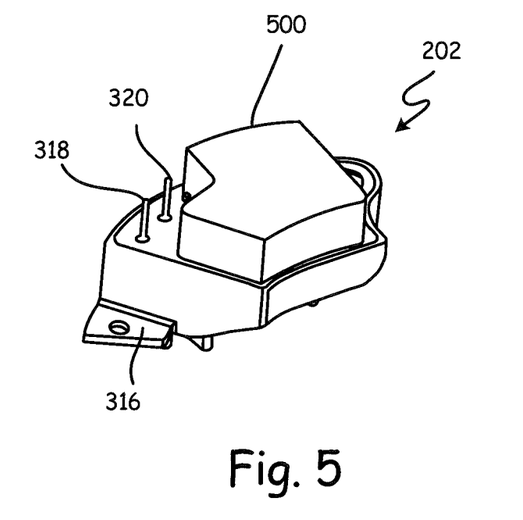
FIG. 5 is a bottom perspective view of a power terminal.
Figure 6:
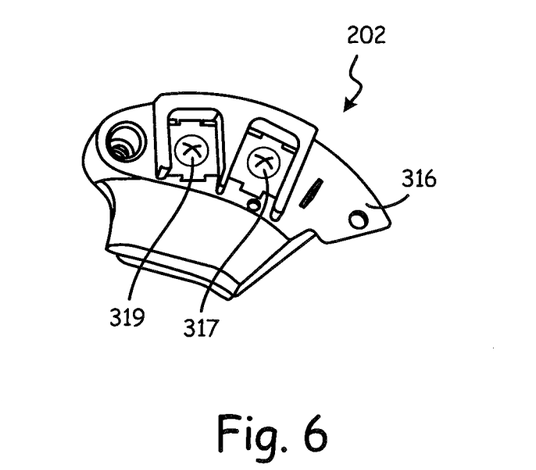
FIG. 6 is a top perspective view of the power terminal of FIG. 5.
Figure 7:
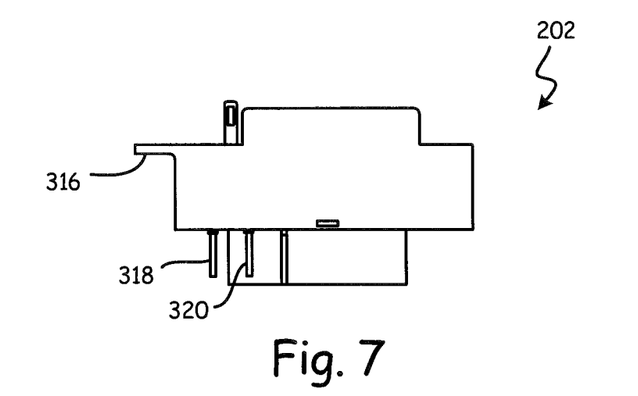
FIG. 7 is a back view of the power terminal of FIG. 5.
Figure 8:
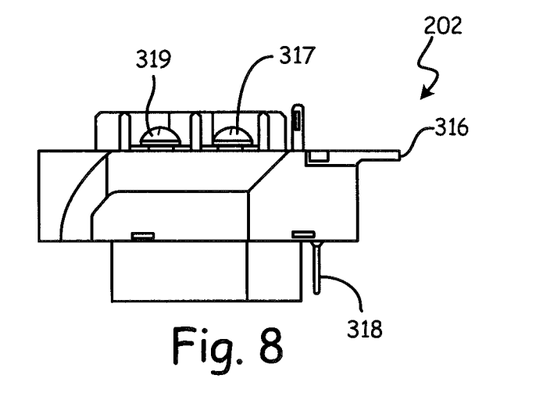
FIG. 8 is a front view of the power terminal of FIG. 5.
Figure 9:
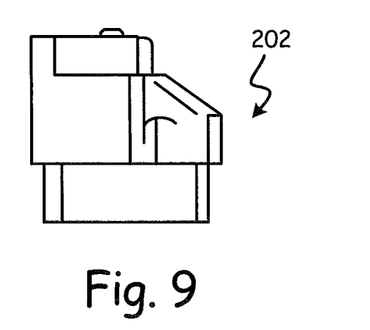
FIG. 9 is a left side view of the power terminal of FIG. 5.
Figure 10:
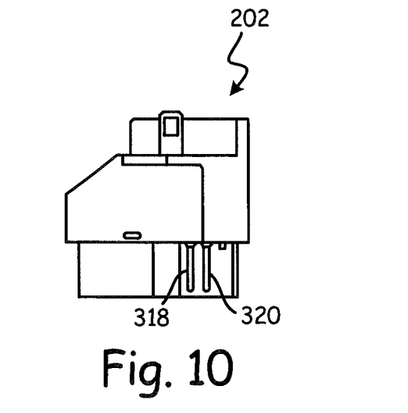
FIG. 10 is a right side view of the power terminal of FIG. 5.

FIGS. 5, 6, 7, 8, 9 and 10 provide a back perspective view, a front perspective view, a back view, a front view, a left side view, and a right side view, respectively, of an embodiment of removable power terminal block 202. As shown in FIG. 5, removable power terminal block 202 includes a shaped bottom cover 500 that has an external shape that matches the shape of cavity 302 in recess 300 of sensor terminal block 200.

Figure 11:
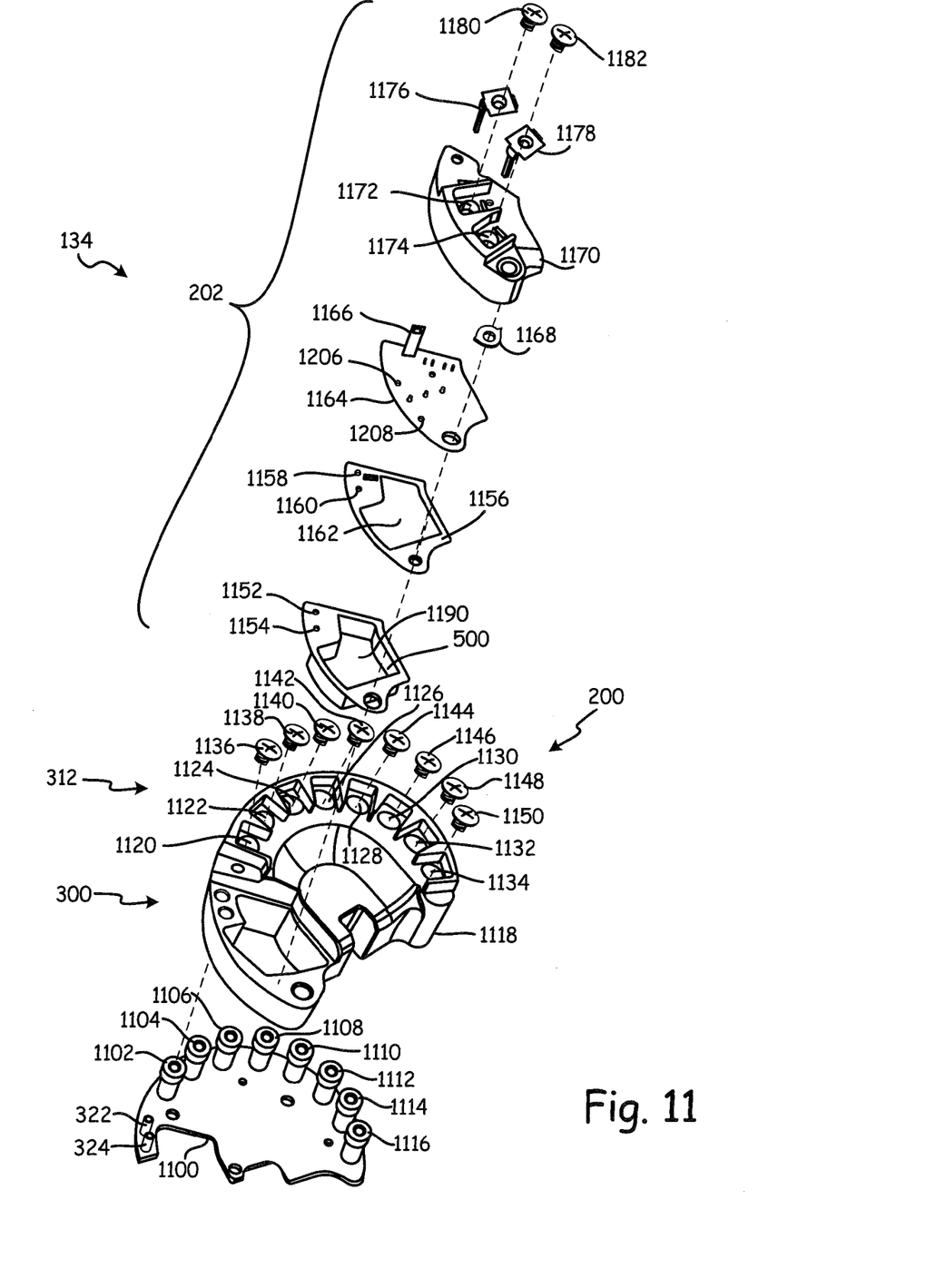
FIG. 11 is a top exploded perspective view of the terminal block of FIG. 1.
Figure 12:
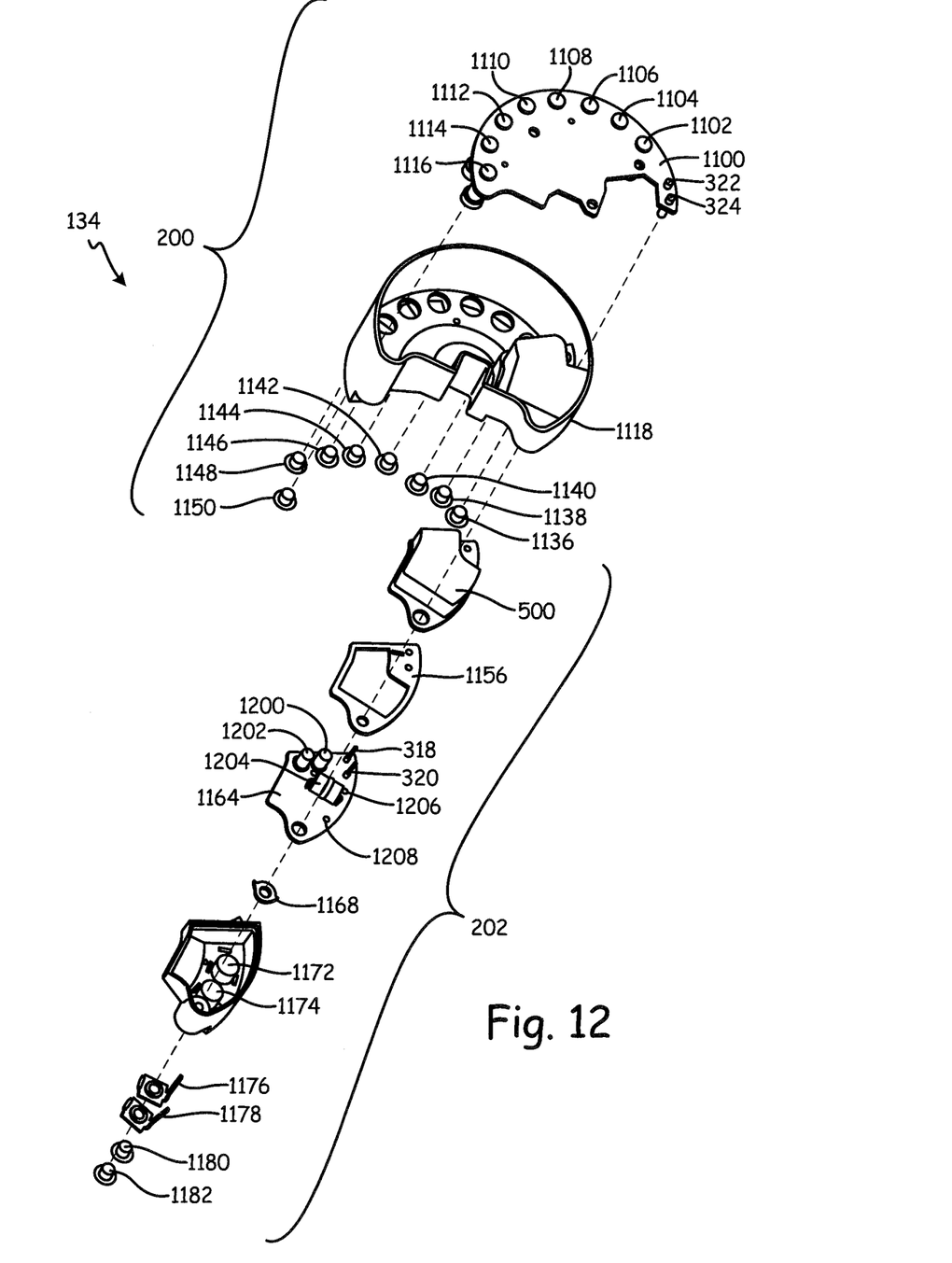
FIG. 12 is a bottom exploded perspective view of the terminal block of FIG. 1.

FIG. 11 provides a top exploded perspective view and FIG. 12 provides a bottom exploded perspective view of an embodiment of terminal block 134. In FIGS. 11 and 12, removable power terminal block 202 is a removable transient power terminal block that includes transient power protection components to suppress transient voltages and/or currents above certain thresholds.

As shown in FIGS. 11 and 12, sensor terminal block 200 includes backing plate 1100 to which conductive posts 1102, 1104, 1106, 1108, 1110, 1112, 1114 and 1116 are attached. The back ends of these posts is shown in FIG. 4 as post ends 414, 412, 410, 408, 406, 404, 402 and 400, respectively. Each of these posts has a corresponding opening into which is fastened a respective screw 1136, 1138, 1140, 1142, 1144, 1146, 1148 and 1150. Conductive posts 1102, 1104, 1106, 1108, 1110, 1112, 1114 and 1116 pass through circular openings 1120, 1122, 1124, 1126, 1128, 1130, 1132 and 1134 in shroud 1118. Shroud 1118 defines recess 300 and raised sensor section 312. In accordance with one embodiment, shroud 1118 is constructed of a non-conductive material such as a non-conductive polymer. A sensor line is connected to sensor terminal block 200 by wrapping, an exposed conductor in the sensor line around one of screws 1136, 1138, 1140, 1142, 1146, 1148 and 1150 and then tightening the screw into one of the corresponding posts 1102, 1104, 1106, 1108, 1110, 1112, 1114 and 1116 to secure the line between the head of the screw and a top of the corresponding post.

According to this embodiment, removable power terminal block 202 includes a top case 1170 and bottom cover 500. A circuit board 1164 is positioned between top case 1170 and bottom cover 500. Circuit board 1164 includes a non-conductive layer on which conductive traces are printed to selectively connect components mounted to circuit board 1164. Those components include power terminals 318 and 320 and transient power protection components such as grounding tab 1166, fuses 1200 and 1202 and gas discharge tube 1204. Two conductor posts 1176 and 1178, which form part of the power line connectors 317 and 319, extend through openings in top case 1170 and make electrical connections with conductive traces on circuit board 1164 at holes 1206 and 1208 respectively. Through the conductive traces, the transient power protection components are electrically coupled between conductor posts 1176 and 1178 and power terminals 318 and 320. The transient power protection components suppress transient power above threshold limits to limit the power reaching power terminals 318 and 320. The suppression of transient power can include suppressing transient voltage, transient current or both transient voltage and transient current.

Fuses 1200 and 1202 and gas discharge tube 1204 fit within a recess 1190 in bottom cover 500. Power terminals 318 and 320 pass through and seal against holes 1152 and 1154 in bottom cover 500. A sealing foam layer 1156 with openings 1158 and 1160 for the power terminals and opening 1162 for the power protection components is positioned between circuit board 1164 and bottom cover 500 and forms a seal between circuit board 1164 and bottom cover 500. A foam sealing ring 1168 is positioned between circuit board 1164 and top case 1170. In accordance with some embodiments, bottom cover 500 includes tabs that fit within slots in top case 1170 to secure bottom cover 500 to top case 1170.

Fasteners 1180 and 1182 screw into openings in conductor posts 1176 and 1178 and extend into two wells 1172 and 1174 in top case 1170. Conductor post 1176 and fastener 1180 together form power line connector 317 and conductor post 1178 and fastener 1182 form power line connector 319. Power lines are connected to removable power terminal block 202 by wrapping exposed portions of conductors in the power lines around fasteners 1180 and 1182 and further screwing fasteners 1180 and 1182 into posts 1176 and 1178 to bring the conductors into contact with posts 1176 and 1178.

Figure 13:
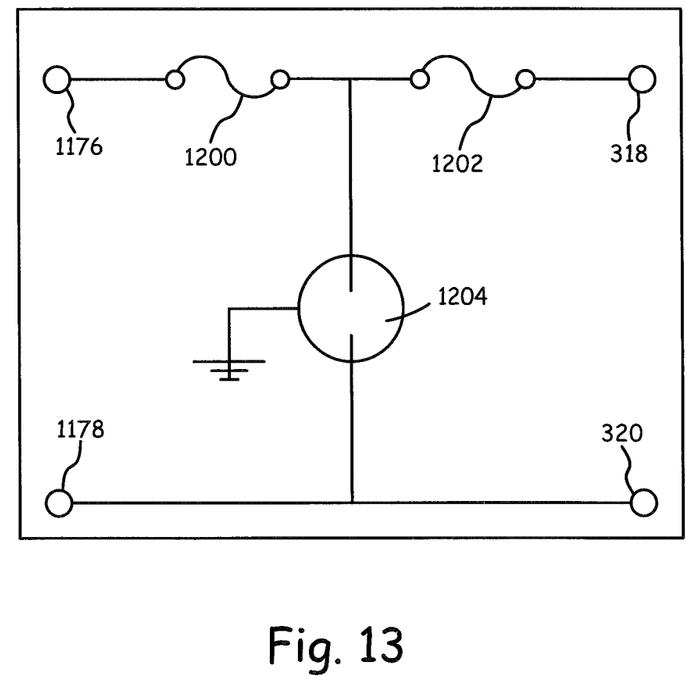
FIG. 13 is a circuit diagram of a transient power terminal block.

FIG. 13 provides a circuit diagram of the circuit components on circuit board 1164 in removable power terminal block 202. In particular, the circuit diagram of FIG. 13 provides the circuit elements of a transient power terminal block according to one embodiment of the invention. Fuses 1200 and 1202 are connected in series between post 1176 and power interface pin 318. Gas discharge tube 1204 is connected at one end at a point between fuses 1200 and 1202 and at another end along a conductor between post 1178 and pin 320. An outer casing of gas discharge tube 1204 is additionally connected to ground. Fuses 1200 and 1202 will break the current flow if excessive current flow crosses either fuse 1200 or fuse 1202. Gas discharge tube 1204 limits the voltage that can appear across gas discharge tube 1204 and thereby limits the voltage that can appear across pins 318 and 320.

Figure 14:
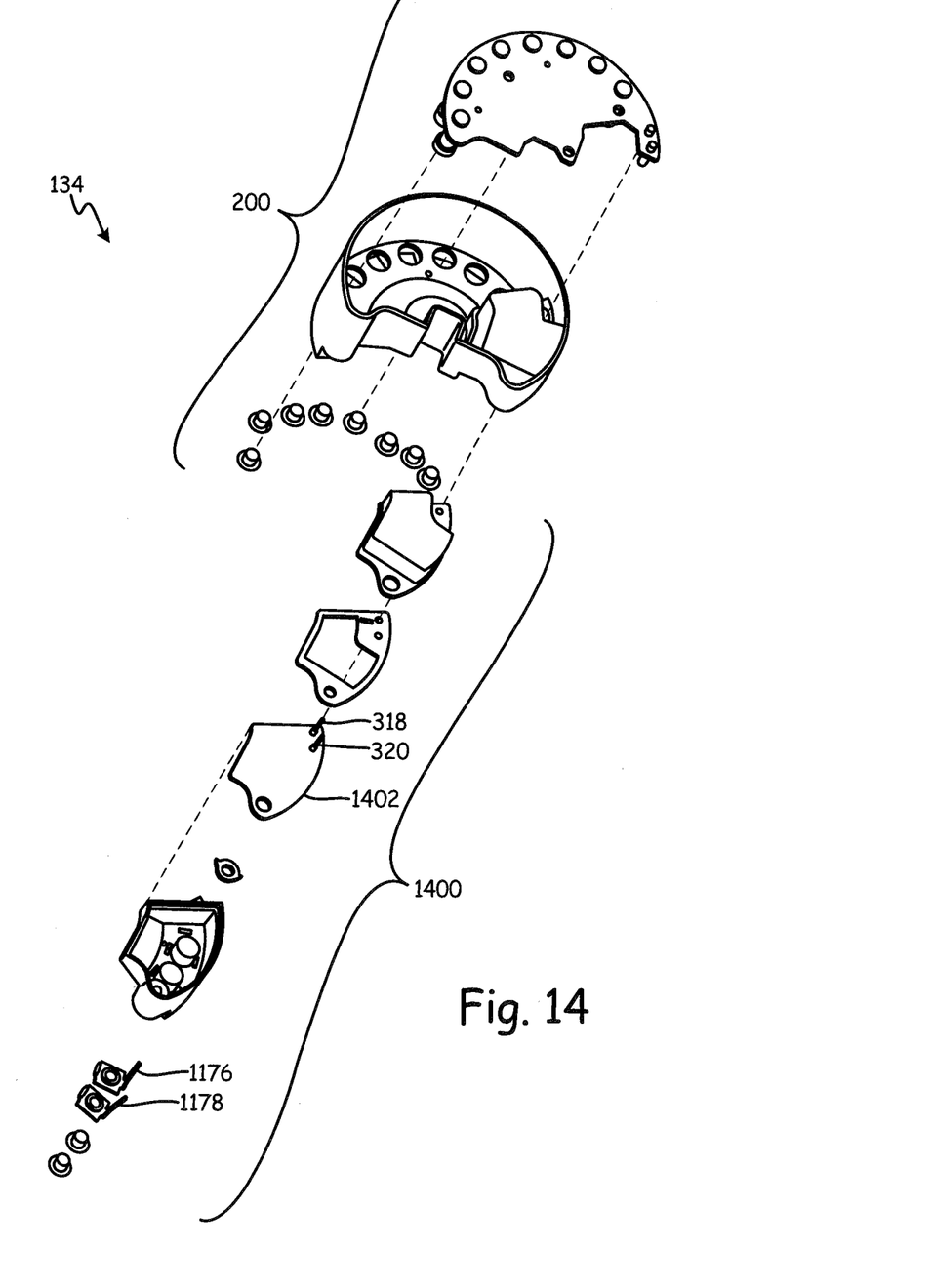
FIG. 14 is a back perspective exploded view of a terminal block with a standard power terminal block.

FIG. 14 provides an exploded back perspective view of one embodiment of terminal block 134 with a removable standard power terminal block 1400. Removable standard power terminal block 1400 is also referred to as a removable standard power terminal module. All the elements of FIG. 14 are identical to FIGS. 11 and 12 except for printed circuit board 1402, which replaces printed circuit board 1164. Printed circuit board 1402 includes a non-conductive layer with printed conductive traces that selectively connect components on printed circuit board 1402. Printed circuit board 1402 lacks transient power suppression components and instead includes conductive traces that connect power interface pins 318 and 320 directly to posts 1176 and 1178.

Figure 15:
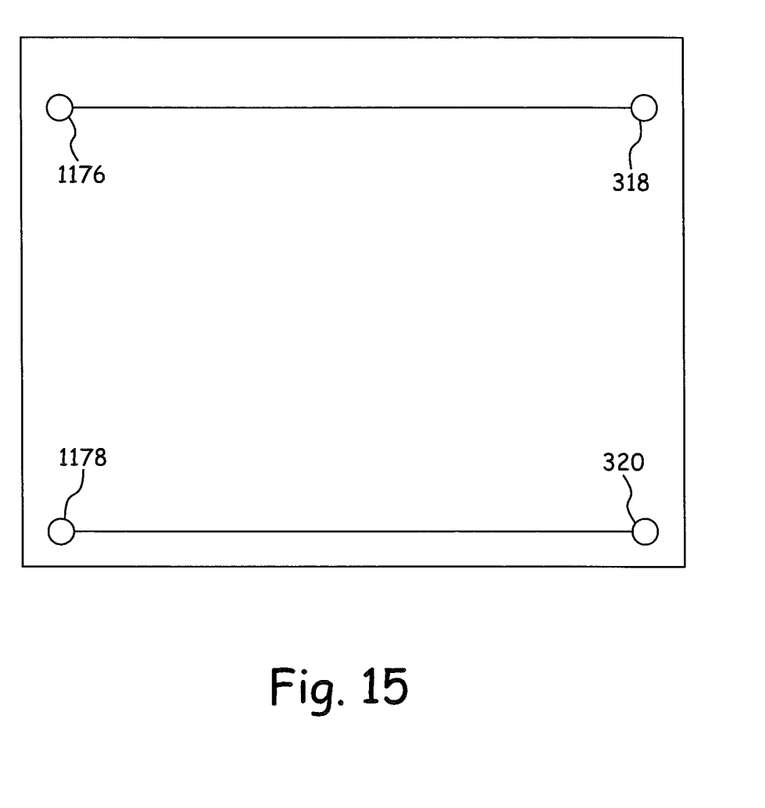
FIG. 15 is a circuit diagram of a standard power terminal block.

FIG. 15 provides a circuit diagram of the circuit on circuit board 1402. In the circuit diagram of FIG. 15, post 1176 is connected directly to power pin 318 and post 1178 is connected directly to power pin 320.

Figure 16:
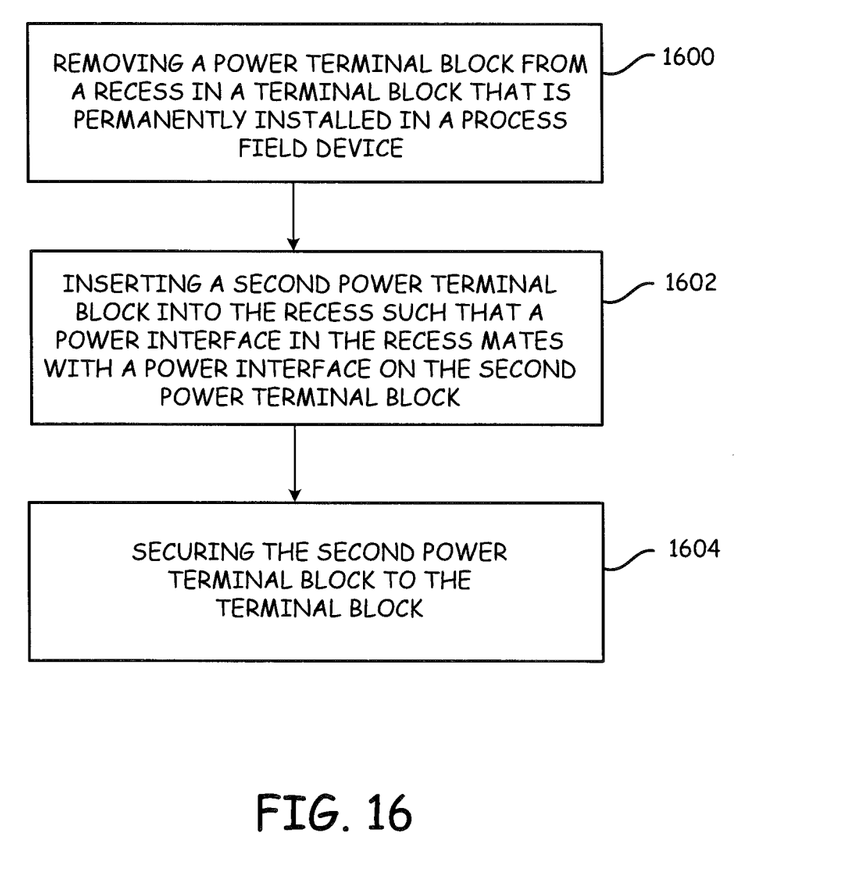
FIG. 16 is a flow diagram of a method.

FIG. 16 provides a method under one embodiment. In step 1600, a removable power terminal is removed from a recess in a terminal block that is permanently installed in a process variable transmitter. A second power terminal is inserted into the recess such that a power interface in the recess mates with a power interface on the second power terminal at step 1602. At step 1604, the second power terminal is secured to the terminal block.

In the above discussion, multiple types of removable power terminals are provided including a standard power terminal that lacks transient power protection components and a transient voltage power terminal that includes transient power protection components. In other embodiments, additional power terminals may be provided such as power terminals with alternate power conductivity options. Additionally, the power terminals can include passive or active indications via LEDs to show that power is applied or that an alarm is active. FISCO (Fieldbus Intrinsically Safe Concept) support could also be added as an option.

Terminal block 134 allows for easy attachment of wires during installation while still providing a transient suppression power terminal block. The easy installation is achieved because the transient power terminal block is placed in the same space as the standard power terminal block and thus does not take up any more space than the standard power terminal block. Further, the design allows for future power options without replacing the sensor terminal blocks. Thus, as future power terminal circuitry is designed, new power terminal blocks may replace older power terminal blocks without affecting the sensor terminal blocks. This also means that field upgrades for the power terminal blocks including field upgrades for transient protection can be made without swapping the entire terminal block. The design also supports light customization during manufacturing and allows for future power options without replacing sensor terminals. Further, the sensitive connections for the sensor terminals remain fixed within the transmitter, housing thus protecting the sensor signal from degradation due to poor connections between the sensor connection terminal and the circuitry module. In addition, the current design allows for less expensive transmitters with transient protection since a separate transient protection circuit is not needed. Instead, the standard power terminal is replaced with a transient power terminal thus reducing the cost of the transmitter compared to transmitters in which transient protection is simply added as an additional circuit to the terminal block.

Although the present invention has been described with reference to preferred embodiments, workers skilled in the art will recognize that changes may be made in form and detail without departing from the spirit and scope of the invention.

What is claimed is:
1. A process variable transmitter comprising:
 a sensor terminal block comprising a plurality of sensor line connectors to connect to sensor lines from at least one process variable sensor, the sensor terminal block defining a reception area that in a first instance accepts a removable standard power terminal block and in a second instance accepts a removable transient power terminal block, the removable standard power terminal block comprising at least two power line connectors for connecting to at least two respective power lines that are external to the standard power terminal block and provide power to the standard power terminal block, the removable transient power terminal block comprising at least two power line connectors for connecting to the at least two respective power lines, at least two power terminals and transient power protection components electrically coupled between the at least two power line connectors and the at least two power terminals, the transient power protection components suppressing transient power above a threshold limit to limit the power reaching the at least two power terminals; and one of the removable standard power terminal block and the removable transient power terminal block inserted in the reception area of the sensor terminal block.

2. The process variable transmitter of claim 1 wherein the removable standard power terminal block further comprises at least two power terminals electrically coupled to respective power line connectors.

3. The process variable transmitter of claim 2 wherein the at least two power terminals comprise at least two pins that pass into the sensor terminal block.

4. The process variable transmitter of claim 1 wherein the at least two power terminals comprise at least two pins that pass into the sensor terminal block.

5. A terminal block for a process variable transmitter, the terminal block comprising:

a shroud having a raised sensor section comprising a plurality of sensor line connectors for connecting to sensor lines and a recessed power section having a power interface wherein the power interface is recessed relative to at least one of the sensor line connectors; and a power terminal module having a plurality of power line connectors for connecting to power lines and a mating power interface mated with the power interface of the shroud, the power terminal module positioned within the recessed power section.

6. The terminal block of claim 5 wherein the power interface and the mating power interface are mated by a pin of one of the power interface and the mating power interface being inserted in an opening in the other of the power interface and the mating power interface.

7. The terminal block of claim 5 wherein the power terminal module is a first type of power terminal module and wherein the power terminal module may be replaced by a second type of power terminal module without replacing the shroud.

8. The terminal block of claim 7 wherein the first type of power terminal module comprises a standard power terminal module and wherein the second type of power terminal module comprises a transient suppression power terminal module.

9. The terminal block of claim 8 wherein the transient suppression power terminal module comprises at least one component that limits voltage provided to the mating power interface.

10. The terminal block of claim 5 wherein the power terminal module and the shroud each have an outer cylindrical surface such that the outer cylindrical surface of the power terminal module is aligned with the outer cylindrical surface of the shroud.

11. The terminal block of claim 5 wherein the shroud further comprises a back section for permanent connection to a housing of the process variable transmitter.

12. A method comprising:

accessing a terminal block permanently installed in a process variable transmitter;

inserting a power terminal module into a recess of the terminal block such that a power interface in the recess mates with a power interface on the power terminal module; and securing the power terminal module to the terminal block such that power line connectors on the power terminal module are accessible and such that a surface of the power terminal module and a surface of the terminal block together partially define a well for wires that are to be connected to the power line connectors.

13. The method of claim 12 wherein the power terminal module comprises a standard power terminal module that lacks transient power suppression.

14. The method of claim 12 wherein the power terminal module comprises a transient protection power terminal module that includes transient power suppression.

15. The method of claim 14 further comprising before inserting the transient protection power terminal module, removing a standard power terminal module from the recess of the terminal block.

16. The method of claim 12 wherein the power interface in the recess comprises a conductive cylinder and wherein the power interface of the power terminal module comprises a conductive pin that fits within and makes contact with the conductive cylinder.

17. The method of claim 12 wherein terminal block comprises sensor wire connectors for connecting to sensor wires from a process variable sensor.

\* \* \* \* \*